US011384007B2

(12) United States Patent
Tada et al.

(10) Patent No.: US 11,384,007 B2
(45) Date of Patent: Jul. 12, 2022

(54) BUSHING FOR PRODUCING GLASS FIBERS

(71) Applicant: TANAKA KIKINZOKU KOGYO K.K., Tokyo (JP)

(72) Inventors: Tomoyuki Tada, Ichikawa (JP); Toshihiro Osawa, Isehara (JP); Naoya Nagao, Uji (JP); Atsushi Nakaoka, Uji (JP)

(73) Assignee: TANAKA KIKINZOKU KOGYO K.K., Tokyo (JP)

( * ) Notice: Subject to any disclaimer, the term of this patent is extended or adjusted under 35 U.S.C. 154(b) by 0 days.

(21) Appl. No.: 17/273,674

(22) PCT Filed: Sep. 6, 2019

(86) PCT No.: PCT/JP2019/035106
§ 371 (c)(1),
(2) Date: Mar. 4, 2021

(87) PCT Pub. No.: WO2020/050393
PCT Pub. Date: Mar. 12, 2020

(65) Prior Publication Data
US 2021/0340053 A1    Nov. 4, 2021

(30) Foreign Application Priority Data
Sep. 7, 2018    (JP) .............................. JP2018-167781

(51) Int. Cl.
*C03B 37/083*    (2006.01)
*C03B 37/08*    (2006.01)
*C03B 37/095*    (2006.01)

(52) U.S. Cl.
CPC ........ *C03B 37/083* (2013.01); *C03B 37/0805* (2013.01); *C03B 37/095* (2013.01)

(58) Field of Classification Search
None
See application file for complete search history.

(56) References Cited

U.S. PATENT DOCUMENTS

| 3,685,978 | A |   | 8/1972 | Hansen et al. |
| 3,859,070 | A | * | 1/1975 | Slonaker ............... C03B 37/095 |
|   |   |   |   | 65/493 |

(Continued)

FOREIGN PATENT DOCUMENTS

| EP | 0 381 179 A2 | 8/1990 |
| JP | H02-502718 A | 8/1990 |

(Continued)

OTHER PUBLICATIONS

JP-2002128538-A EPO Machine Translation of the Description—Performed Oct. 19, 2021. (Year: 2021).*

(Continued)

*Primary Examiner* — Lisa L Herring
(74) *Attorney, Agent, or Firm* — Foley & Lardner LLP

(57) ABSTRACT

A bushing for producing glass fibers, including: a base plate; and multiple nozzles from which molten glass is discharged, in which a nozzle group formed with the alignment of the multiple nozzles is joined to the base plate. A coating layer made of ceramics is formed on each of the nozzles forming at least a row of the outermost layer of the nozzle group, but the coating layer does not cover the entire nozzle, that is, the nozzle is covered so as to be in a state of no coating layer in the vicinity of the nozzle tip.

11 Claims, 3 Drawing Sheets

(56) References Cited

U.S. PATENT DOCUMENTS

| | | | |
|---|---|---|---|
| 4,140,507 A * | 2/1979 | Costin | C03B 37/095 |
| | | | 65/374.11 |
| 4,846,865 A | 7/1989 | Hinze | |
| 5,928,402 A | 7/1999 | Mirth et al. | |
| 2016/0332906 A1 | 11/2016 | Osawa et al. | |
| 2017/0247283 A1 | 8/2017 | Osawa et al. | |

FOREIGN PATENT DOCUMENTS

| | | | | |
|---|---|---|---|---|
| JP | H03-17295 A | 1/1991 | | |
| JP | H06-298543 A | 10/1994 | | |
| JP | 2001-513478 A | 9/2001 | | |
| JP | 2002128538 A * | 5/2002 | | C03B 37/083 |
| JP | 2012-001434 A | 1/2012 | | |
| JP | 5795104 B1 | 10/2015 | | |
| JP | 5813145 B2 | 11/2015 | | |

OTHER PUBLICATIONS

International Searching Authority, "International Search Report," issued in connection with International Patent Application No. PCT/JP2019/035106, dated Nov. 19, 2019.

International Searching Authority, "Written Opinion," issued in connection with International Patent Application No. PCT/JP2019/035106, dated Nov. 19, 2019.

Extended European Search Report issued in corresponding European Patent Application No. 19856692.9 dated Apr. 21, 2022.

* cited by examiner

BUSHING FOR PRODUCING GLASS FIBERS

CROSS-REFERENCE TO RELATED APPLICATIONS

The present application claims priority under 37 U.S.C. § 371 to International Patent Application No. PCT/JP2019/035106, filed Sep. 6, 2019, which claims priority to and the benefit of Japanese Patent Application No. 2018-167781, filed on Sep. 7, 2018. The contents of these applications are hereby incorporated by reference in their entireties.

TECHNICAL FIELD

The present invention relates to a bushing for producing glass fibers from molten glass. For more details, the present invention relates to a bushing for producing glass fibers, with which glass flow is stably discharged and glass fibers can be spun during long-term device operation.

BACKGROUND ART

Glass fibers are produced by the supply of a glass basis material obtained by the refining and homogenizing of molten glass that has obtained by the heating of a glass raw material (cullet) at a high temperature, to a bushing. The bushing for producing glass fibers is a box-shaped container having a bushing plate to eject glass fibers provided on a bottom face of the container. Further, the bushing plate has a large number of nozzles aligned and attached on a bottom face of a base plate, and the glass basis material is discharged in a fibrous form from the nozzles. The glass fibers discharged from the nozzles are wound up while being cooled. An example of a production process of glass fibers with the use of the bushing is disclosed in Patent Document 1.

A bushing plate for producing glass is generally made of a precious metal material such as platinum, or a platinum alloy. A precious metal material is excellent in the chemical stability and the high-temperature strength, particularly favorable in the high-temperature creep characteristics, and is suitable as a constituent material for a structure body to which stress loading is applied under high temperature, such as a device for producing glass.

RELATED ART DOCUMENT

Patent Document

Patent Document 1: Japanese Translation of PCT International Application Publication No. JP-T-2001-513478

SUMMARY OF THE INVENTION

Problems to be Solved by the Invention

With a bushing made of a precious metal material such as platinum, glass fibers can be stably spun even under a high-temperature environment in which molten glass is distributed. However, according to the field survey of the present inventors, it is understood that homogeneous glass fibers may not be obtained in the course of long-term device operation. This heterogeneity of glass fibers is considered to be due to irregular phenomena such as turbulence of glass flow, and generation of foreign matters, during the glass fiber spinning. The occurrence of such irregular phenomena affects the stable production of glass fibers even if the occurrence is partial to the glass flow discharged from all of the nozzles of the bushing.

Therefore, an object of the present invention is to provide a bushing plate for producing glass fibers, with which the occurrence of various irregular phenomena is suppressed and a uniform glass flow can be achieved stably over a long period of time.

Means for Solving the Problems

In order to solve the problem described above, the present inventors have investigated the factors of the irregular phenomena observed in the glass flow discharged from nozzles. As a result, the present inventors have focused on the situation in the vicinity of nozzles of a bushing plate, the phenomenon of volatilization loss of platinum on a nozzle surface, and the behavior of the volatilized platinum.

The glass basis material supplied to a bushing plate is molten glass having a high temperature of 1500° C. or more. Platinum and a platinum alloy are metal materials having a high-melting point, but are volatile under high temperature. Further, the discharging speed of fibrous glass from a nozzle reaches several thousand meters per minute, and a high-speed air flow is generated in a certain direction around the nozzle that ejects the high-temperature fluid at such a high speed. In addition, from the observation results by the present inventors, the high-speed air flow transports platinum volatilized from the nozzle to the vicinity of a base plate at a high speed. As a result, the nozzle abrades and reduces its thickness rapidly. Further, the volatilized platinum transported to the vicinity of the base plate is cooled and becomes minute lumps of platinum, and the minute lumps adhere onto a surface of the base plate (hereinafter, the minute lumps are referred to as "platinum particles"). The platinum particles basically remain adhered to the surface of the base plate, but may fall off, and thus there may be a fear that the platinum particles are mixed into a product as foreign matters.

Therefore, the present inventors have conceived the present invention in which a coating layer is formed on a nozzle surface of a bushing plate in order to suppress the volatilization loss of platinum in the nozzle.

That is, the present invention is a bushing for producing glass fibers, including: a base plate; and multiple nozzles from which molten glass is discharged, in which a nozzle group formed with alignment of the multiple nozzles is joined to the base plate, a coating layer made of ceramics is formed on each of the nozzles forming at least a row of the outermost layer of the nozzle group, the nozzle on which the coating layer is formed has an end face with no coating layer and a nozzle tip part with no coating layer on the side of glass discharge, and a length of the coating layer is 50% or more and 90% or less with respect to the entire length of the nozzle.

Further, the present invention is a bushing for producing glass fibers, including: a base plate; and multiple nozzles from which molten glass is discharged, in which a nozzle group formed with alignment of the multiple nozzles is joined to the base plate, a coating layer made of ceramics is formed on each of the nozzles forming at least a row of the outermost layer of the nozzle group, the nozzle on which the coating layer is formed has an area with no coating layer of 0.1 mm or more and 2 mm or less from an edge end part and an end face on the side of glass discharge.

As described above, the present inventive bushing plate for producing glass fibers has nozzles on each of which a coating layer is formed, in at least a row of the outermost layer of a nozzle group. Further, the nozzle on which the coating layer is formed has an end face with no coating layer and a tip part with no coating layer on the side of glass discharge.

In addition, the bushing plate for producing glass fibers according to the present invention has the same configuration as that of a conventional bushing plate in terms of the configuration of the base plate and the like. Hereinafter, the features of the bushing plate for producing glass fibers according to the present invention will be described in detail.

The base plate is a member for retaining a glass basis material in a molten state, and has a plate shape, or a box shape by bending. The base plate is provided with through holes at connection positions with nozzles. A material for the base plate is platinum or a platinum alloy, and is preferably a dispersion strengthened platinum alloy or a dispersion strengthened platinum-rhodium alloy is applied for the purpose of improving the strength, in addition to platinum or a platinum-rhodium alloy (rhodium concentration: 5 to 20% by mass).

As the nozzle, a nozzle used in a conventional bushing plate for producing glass fibers is basically applied. Multiple nozzles are aligned and joined to a bottom face of a base plate. The shape of the nozzle is also not particularly limited, and the nozzle may be a straight tube or a tapered tubular body. Further, platinum or the above-described platinum alloy is applied also as the material for the nozzle.

In the present invention, a coating layer is formed on nozzles in at least a row of the outermost layer of a nozzle group (see FIG. 1). The reason why the coating to the row of the outermost layer is essential is because the row is a part that is particularly affected by high-speed air flow, and causes the abrasion and thinning due to the combination of platinum volatilization and the air flow. In addition, the row of the outermost layer means a row at both ends of the length and breadth of the aligned nozzle group.

The coating layer of the nozzle is not necessary to cover the entire nozzle without leaving any space. That is, the nozzle has an end face with no coating layer on the side of glass discharge. Further, an area with no coating layer is set in a tip part on the nozzle side in addition to the nozzle end face. Depending on the operational status of a device for producing glass, the molten glass may rise on the side of the nozzle tip part from the nozzle end face. When the risen molten glass comes into contact with a coating layer, the coating layer may be disappeared. In view of this, a coating area having an appropriate length is set on the nozzle to avoid the contact between the molten glass and the coating layer.

An area where a coating layer of a nozzle is formed is set so that the coating layer covers an area in a range of 50% or more and 90% or less with respect to the entire length of the nozzle, when set as the ratio of length to the entire length of the nozzle. That is, an area that is less than 50% and exceeds 10% with respect to the entire length of the nozzle is set as a non-coating area. In this setting condition, complicated effects such as rising of molten glass and wear of a nozzle tip part, which may occur due to various operational statuses, are taken into consideration. In this regard, the entire length of the nozzle is a length in the vertical direction of from the nozzle tip to the base (joint part with the base plate) of the nozzle.

Further, depending on the operational status and the like, it may be convenient to set the area where a coating layer is formed with specific dimension values. Specifically, a nozzle end face and an area of 0.1 mm or more and 2 mm or less from an edge end part on the nozzle end face on the side of glass discharge are set to the area where a coating layer is not formed, and the other part is set as the area where a coating layer is formed. The distance from the nozzle edge end part is measured from the edge of the nozzle along the nozzle side.

In the bushing plate for producing glass fibers of the present invention, a coating layer is formed in an area where either of the above two conditions for nozzles forming at least a row of the outermost layer of a nozzle group is satisfied. In this regard, it may be accepted if either one of the above two conditions is satisfied, but it may be resulted in that both conditions are satisfied.

In addition, in the bushing plate for producing glass fibers, the number of nozzles to be arranged is not particularly limited, but is usually 200 to 10000 nozzles in many cases. In those cases, the nozzle groups in each of which nozzles are arranged at regular intervals may be arranged in multiple island shapes. When the coating layer for the nozzle row of the outermost layer of a nozzle group is formed, the coating layer may be formed for the nozzle row being the outermost layer along the four sides of a base plate of each nozzle group.

In the present invention, a coating layer is formed at least for the row of the outermost layer of a nozzle group, but the coating layer may be formed for the entire nozzle group (see FIG. 2). The effects of platinum volatilization due to high temperature heating may be generated in the overall nozzle group, and it may be preferable to protect the nozzle rows inside the nozzle group with the coating layer.

Further, the coating layer can be formed also on a base plate in addition to the nozzles. It is not completely immune from the risk of platinum volatilization also in the base plate. By the formation of a coating layer on the entire bottom surface of a bushing plate, the concern about the platinum volatilization can be wiped out.

When a coating layer is formed also on the base plate in addition to the nozzles, at least a part of the base plate can be coated. For example, a pair of plate-shaped coating layers having a width along either the longer side or shorter side of the base plate may be formed, or a frame-shaped coating layer having a width along the four sides of the base plate may be formed. Further, a coating layer may be formed on the entire surface of the base plate (see FIG. 3).

A material for the coating is preferably at least any one of alumina, zirconia, and yttria-stabilized zirconia. Suppression of platinum volatilization under high-temperature heating and protection against abrasion due to high-temperature high-speed air flow are taken into consideration. In particular, for the molten glass for forming long glass fibers, a coating material including yttria-stabilized zirconia is useful for the reason of preventing the volatilization.

The thickness of the coating layer is preferably 50 μm or more and 500 μm or less. If the coating layer is extremely thin, there is no protection effect, and in addition, if the coating layer is extremely thick, the coating layer may peel off when the nozzle or plate is even slightly deformed. A thermal-sprayed film is preferable for the form of the coating layer. Thermal spraying is a suitable method for forming the above-described ceramic film having a suitable film thickness. The thermal sprayed film is a relatively dense film, and can effectively function as a protective layer.

Advantageous Effects of the Invention

As described above, the present inventive bushing plate for producing glass fibers has a coating layer formed at least on the nozzle based on a conventional bushing plate. This is to suppress the volatilization of the platinum that is a constituent material of the nozzle, and further to avoid the effects due to the high-speed air flow around the nozzle. The present invention enables the long-term device operation while suppressing irregular phenomena such as turbulence of glass flow and generation of foreign matters during glass fiber spinning.

The present inventive bushing plate for producing glass fibers is particularly suitable for the production of long glass fibers of fine count. This is because the troubles to be concerned about the glass fibers of fine count, such as fiber breakage, and variation of count can be reduced by the effects of the present invention.

DESCRIPTION OF EMBODIMENTS

Figure 1:
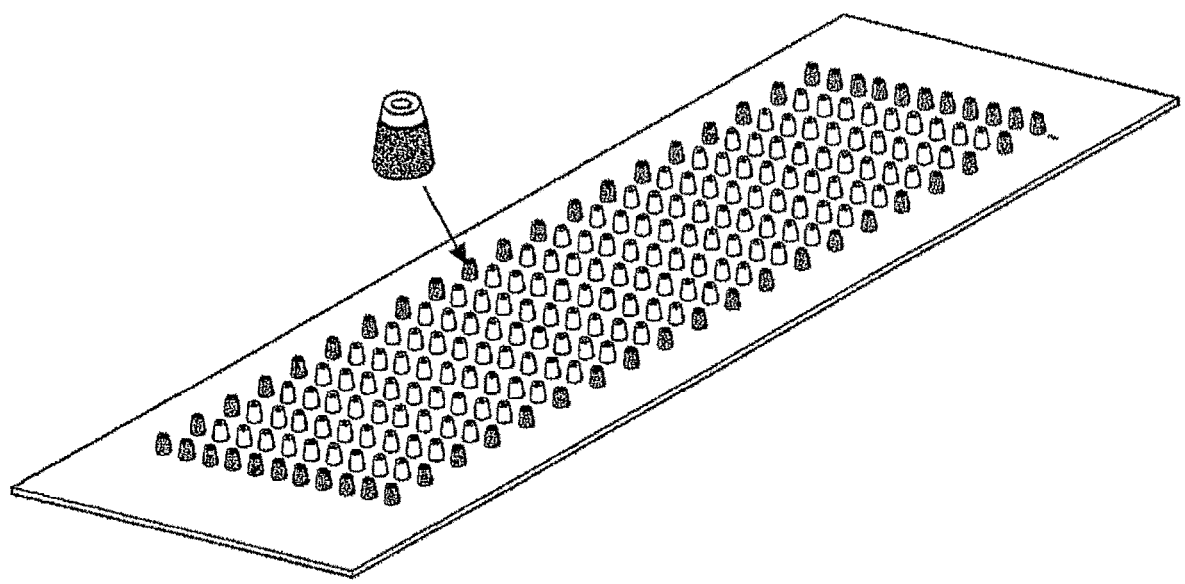
FIG. 1 illustrates one embodiment of the bushing plate for producing glass fibers according to the present invention (only the nozzle row of the outermost layer is coated).
Figure 2:
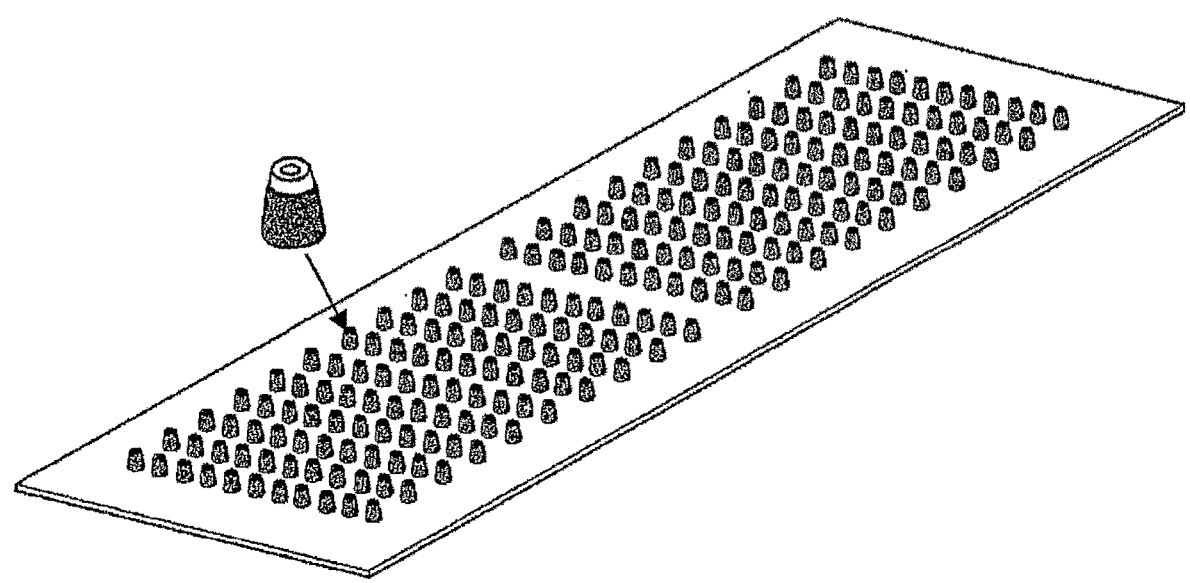
FIG. 2 illustrates one embodiment of the bushing plate for producing glass fibers according to the present invention (all of the nozzles are coated).
Figure 3:
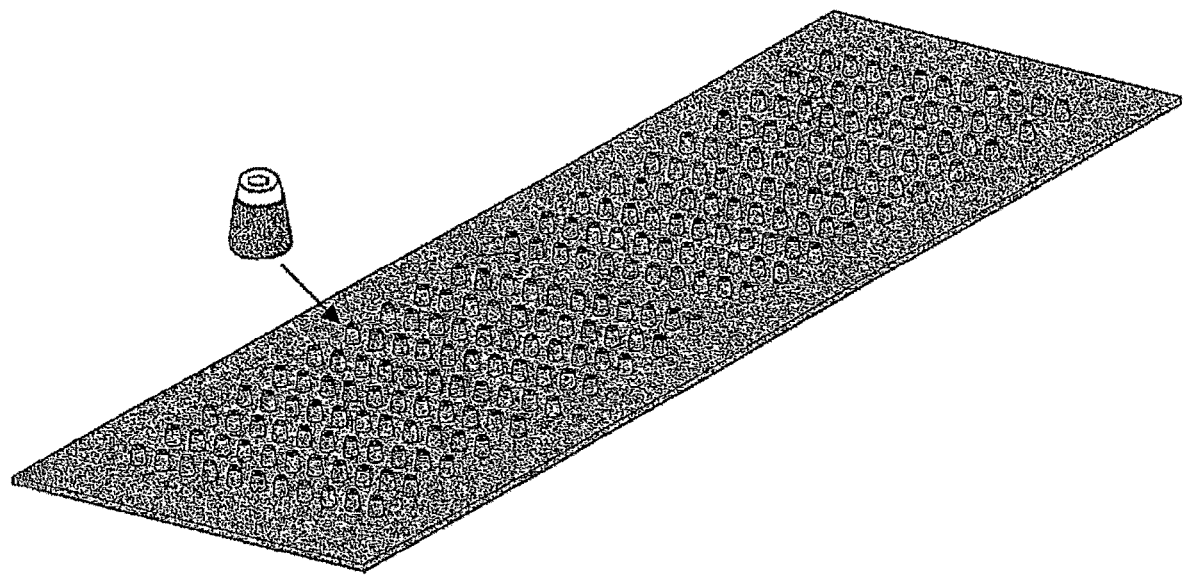
FIG. 3 illustrates one embodiment of the bushing plate for producing glass fibers according to the present invention (the base plate and all of the nozzles are coated).
Figure 4:
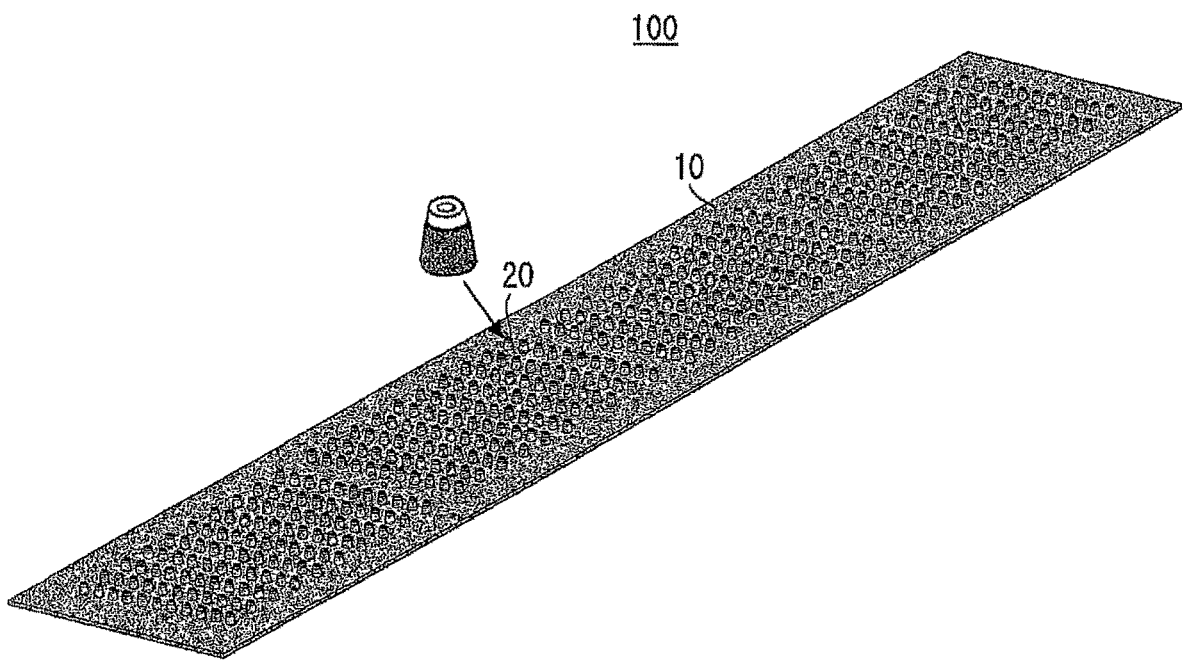
FIG. 4 illustrates the bushing plate for producing glass fibers of the present embodiment.

Hereinafter, the embodiment of the present invention will be described. FIG. 4 illustrates a bushing plate 100 for producing glass fibers produced in the present embodiment. In FIG. 4, a bushing plate for producing glass fibers is provided with a base plate 10, and multiple nozzles 20 aligned on the bottom face.

The base plate 10 is formed of a plate material made of platinum (bottom face size: 444 mm×120 mm, having a thickness of 1.5 mm). Further, the nozzles 20 are joined to the base plate 10 with the formation of four nozzle groups in island shapes. In each of the nozzle groups, 20 nozzles×20 nozzles are joined at 6.4 mm intervals. The total number of the nozzles joined to the base plate 10 is 1600. Each of the nozzles 20 has a tapered cylindrical body having an outer shape of 2.94 mm (outer diameter at the upper end)×2.35 mm (outer diameter at the lower end). Further, the entire length of the nozzle after the joining to the base plate is 4 mm. In addition, the base plate and the nozzles are all made of platinum.

In the bushing plate 100 for producing glass fibers of the present embodiment, a coating layer of yttria-stabilized zirconia is formed on all of the nozzles 20 and the base plate 10. The coating layer is not formed in an area within 0.8 mm in the vertical direction from the nozzle tip on an end face of the nozzle, and the base metal is exposed in the area. That is, the coating layer is formed in an area having a length of 80% with respect to the entire length of the nozzle. In addition, The thickness of the coating layer is 300 μm or less.

As the production process of the bushing plate for producing glass fibers of the present embodiment, the nozzles 20 processed to the above dimensions by boring were aligned and joined to the base plate 10. In the joining of the nozzles 20, holes are made in the nozzles in advance and the nozzles 20 are inserted at respective nozzle attaching positions of the base plate 10, respectively, and then heating was performed to preliminary join the nozzles 20 to the positions in an electric furnace, and further, the base of the joint part was welded from an upper face of the base plate (inflow face of molten glass) with a YAG laser beam. In this way, a bushing plate before coating is produced.

Figure 5:
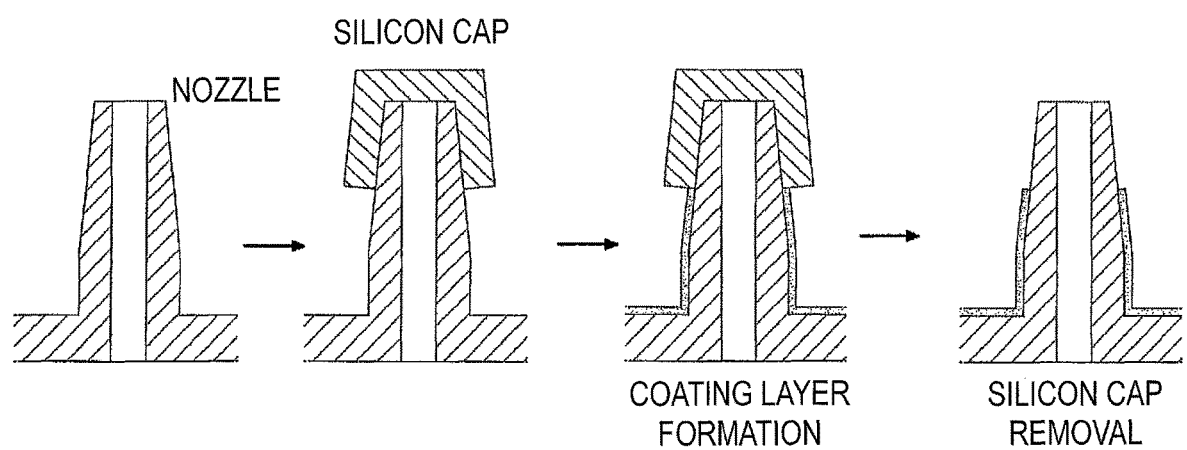
FIG. 5 illustrates a method (silicon cap) for treating a nozzle tip when a coating layer is formed in the present embodiment.

Prior to the formation of the coating layer, a cap made of silicon was put on a tip of each nozzle (FIG. 5). After that, a coating layer was formed on the entire surface of the bushing plate by a thermal spraying method. After the coating layer is formed, the silicon cap was removed to obtain the bushing plate for producing glass fibers of the present embodiment.

Figure 6:
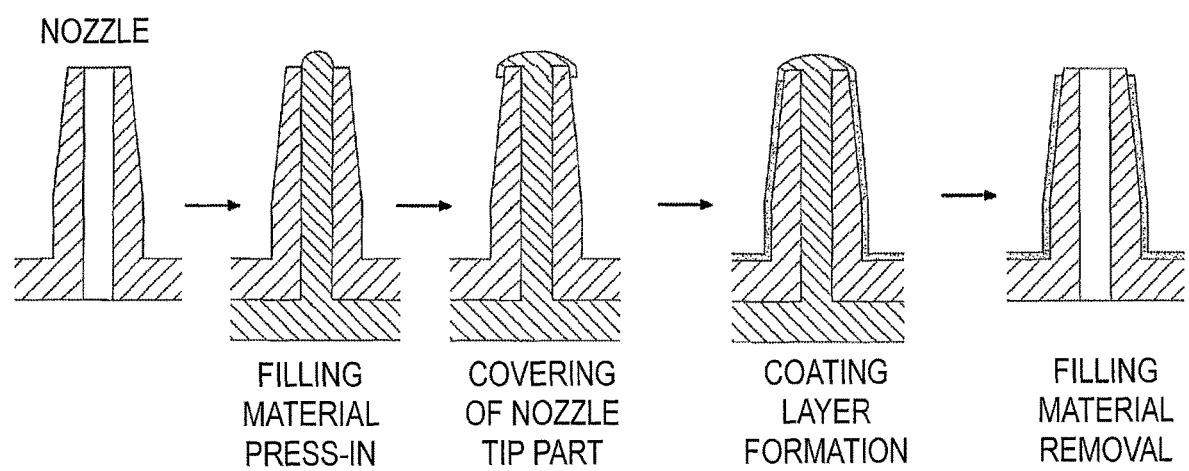
FIG. 6 illustrates another method for treating a nozzle tip when a coating layer is formed.

In this regard, as the method for forming the coating layer partially on the nozzle, the silicon cap was put on the nozzle tip in the present embodiment. In addition to such a technique, there is also a method in which a filling material including clay, modified silicon, a resin or the like is pressed in from a back side (inflow face of molten glass) of a base plate, the filling material is extruded from a discharge port of the nozzle so as to be protruded, and the protruded filling material was crushed and deformed so as to cover the nozzle tip part, and then a coating layer is formed to cover the part other than the tip part of the nozzle (FIG. 6).

Further, in the present embodiment, a nozzle was masked with a silicon cap, and then a coating layer was formed on the entire surface. As described above, the coating may be performed partially. In this case, a part or all of the base plate and nozzles except for nozzles of the outermost layer of a nozzle group are masked, and then the coating is performed, and as a result of which a coating layer can be formed in a desired area.

In addition, as a production example of glass fibers by the use of the bushing plate for producing glass fibers of the present embodiment, first, a terminal and a box-shaped side flange are joined to the above-described bushing plate to form a bushing that is a box-shaped container, the bushing was assembled in a device for producing glass. The device for producing glass is provided with a melting tank for a glass raw material prepared to be a desired composition, a refining tank for molten glass, and a stirring tank for stirring and homogenizing the clarified molten glass, and the bushing is arranged on the downstream side of those tanks. The glass fibers discharged from the bushing are appropriately wound up.

Herein, production of glass fibers was performed for one year by a device for producing glass provided with the bushing plate for producing glass fibers of the present embodiment. During this period, remarkable abnormality was not visually observed in the bushing plate, and the spinning of glass fibers was stable. Further, after one-year operation of the device, the device was shut down and the nozzles of the bushing plate were inspected. As a result, platinum particles were not observed on the base plate. In addition, although slight abrasion of around 0.1 to 0.2 mg/mm$^2$ was observed in the coating layer of the nozzles, any thickness reduction of the platinum basis material of the nozzles was not observed.

INDUSTRIAL APPLICABILITY

The present inventive bushing plate for producing glass fibers enables stable operation of a device for producing glass over a long operation period, and thereby efficient production of good quality glass fibers.

The invention claimed is:

1. A bushing for producing glass fibers, comprising:
a base plate; and
a plurality of nozzles from which molten glass is discharged, wherein
a nozzle group formed with alignment of the plurality of nozzles is joined to the base plate,
a coating layer made of ceramics is formed on each of the plurality of nozzles forming at least a row of an outermost layer of the nozzle group,
each of the plurality of nozzles on which the coating layer is formed has an end face with no coating layer and a nozzle tip part with no coating layer on a side of glass discharge, and
each of the plurality of nozzles on which the coating layer is formed has a length of the coating layer that is 50% or more and 90% or less with respect to an entire length of the nozzle, wherein the base plate and each of the plurality of nozzles are made of platinum or a platinum alloy.

2. The bushing for producing glass fibers according to claim 1, wherein a coating layer made of ceramics is formed further on at least a part of the base plate.

3. The bushing for producing glass fibers according to claim 2, wherein a thickness of the coating layer is 50 μm or more and 500 μm or less.

4. A method for producing the bushing for producing glass fibers defined in claim 2, comprising the step of
putting a cap on each of the plurality of nozzles on which a coating layer is to be formed to cover each nozzle end face and each nozzle tip part, and then applying coating.

5. A method for producing the bushing for producing glass fibers defined in claim 2, comprising the step of
pressing a filling material in from an inlet port of molten glass of each of the plurality of nozzles on which a coating layer is to be formed, protruding the filling material from a discharge port of each of the plurality of nozzles on which a coating layer is to be formed, deforming the protruded filling material so that the filling material covers each nozzle end face and each nozzle tip part, and then applying coating.

6. The bushing for producing glass fibers according to claim 1, wherein a thickness of the coating layer is 50 μm or more and 500 μm or less.

7. A method for producing the bushing for producing glass fibers defined in claim 6, comprising the step of
putting a cap on each of the plurality of nozzles on which a coating layer is to be formed to cover each nozzle end face and each nozzle tip part, and then applying coating.

8. A method for producing the bushing for producing glass fibers defined in claim 6, comprising the step of
pressing a filling material in from an inlet port of molten glass of each of the plurality of nozzles on which a coating layer is to be formed, protruding the filling material from a discharge port of each of the plurality of nozzles on which a coating layer is to be formed, deforming the protruded filling material so that the filling material covers each nozzle end face and each nozzle tip part, and then applying coating.

9. A method for producing the bushing for producing glass fibers defined in claim 1, comprising the step of
putting a cap on each of the plurality of nozzles on which a coating layer is to be formed to cover each nozzle end face and each nozzle tip part, and then applying coating.

10. The method for producing the bushing for producing glass fibers according to claim 9, wherein a part or all of a base plate, and nozzles except for the plurality of nozzles forming at least a row of an outermost layer of the nozzle group are masked, and then coating is applied.

11. A method for producing the bushing for producing glass fibers defined in claim 1, comprising the step of
pressing a filling material in from an inlet port of molten glass of each of the plurality of nozzles on which a coating layer is to be formed, protruding the filling material from a discharge port of each of the plurality of nozzles on which a coating layer is to be formed, deforming the protruded filling material so that the filling material covers each nozzle end face and each nozzle tip part, and then applying coating.

* * * * *